Figure 1:
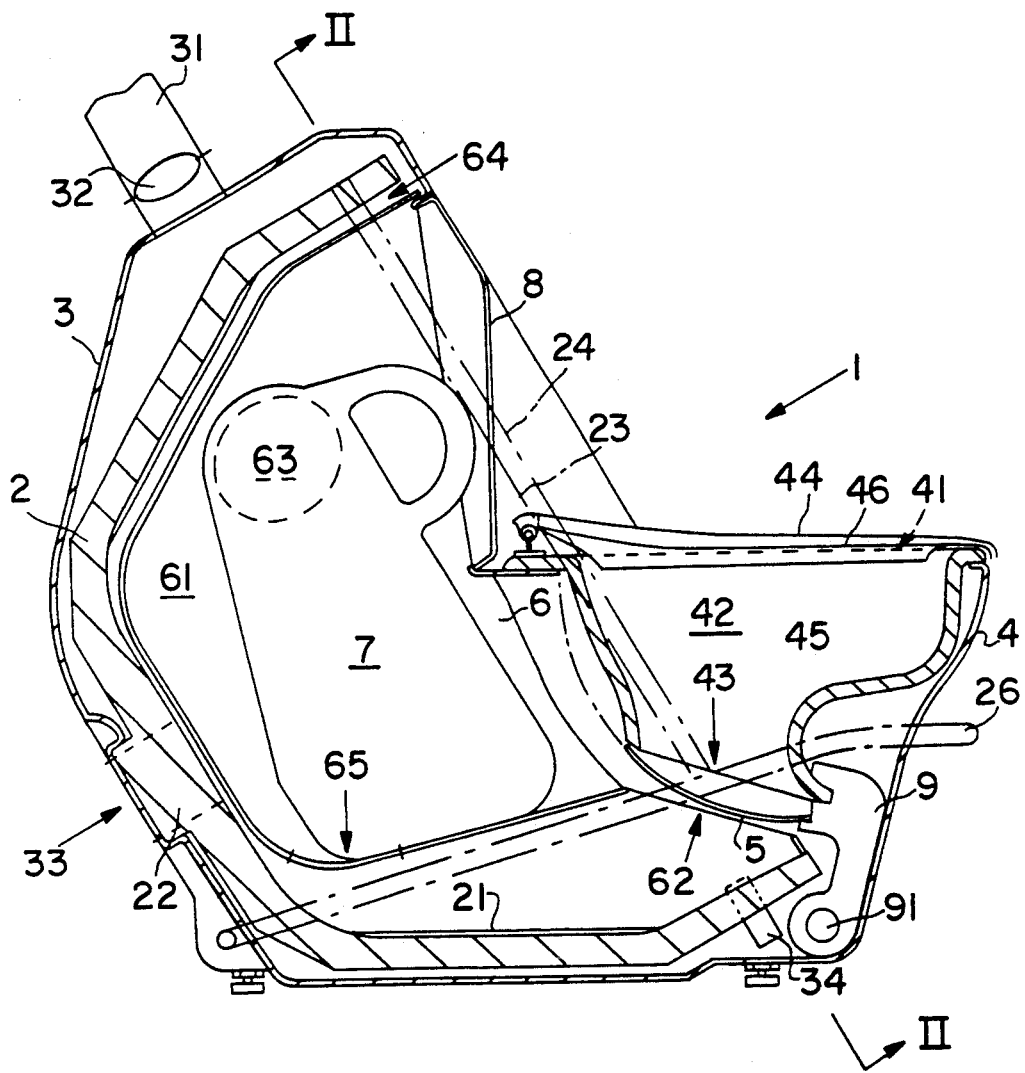

United States Patent [19]

Johansson

[11] Patent Number: 5,303,431
[45] Date of Patent: Apr. 19, 1994

[54] COMPOSTING TOILET

[76] Inventor: Lasse Johansson, 17740 Kasiniemi, Finland

[21] Appl. No.: 917,021

[22] PCT Filed: Dec. 20, 1990

[86] PCT No.: PCT/FI90/00308
§ 371 Date: Aug. 13, 1992
§ 102(e) Date: Aug. 13, 1992

[87] PCT Pub. No.: WO91/09819
PCT Pub. Date: Jul. 11, 1991

[30] Foreign Application Priority Data

Dec. 29, 1989 [FI] Finland .................. 896363

[51] Int. Cl.⁵ ............................. A47K 11/02
[52] U.S. Cl. .................... 4/449; 4/DIG. 12; 4/DIG. 19
[58] Field of Search ........... 4/449, 459, 479, 474, 4/DIG. 12, DIG. 19; 435/312, 315

[56] References Cited

U.S. PATENT DOCUMENTS

| | | | |
|---|---|---|---|
| 1,383,295 | 7/1921 | Gausewitz et al. | 4/459 |
| 3,683,425 | 8/1972 | Patterson | 4/449 |
| 4,364,130 | 12/1982 | Persson | 4/449 |
| 4,633,535 | 1/1987 | Louvo | 4/449 |

FOREIGN PATENT DOCUMENTS

| | | | |
|---|---|---|---|
| 1054307 | 5/1979 | Canada | 4/DIG. 12 |
| 268572 | 11/1971 | Finland . | |
| 54699 | 2/1975 | Finland . | |
| 52709 | 5/1976 | Finland . | |
| 58487 | 10/1980 | Finland . | |
| 854582 | 11/1985 | Finland . | |
| 2347194 | 3/1974 | German Democratic Rep. | 4/449 |
| 396068 | 9/1977 | Sweden . | |
| 617842 | 6/1980 | Switzerland . | |
| 8502172 | 5/1985 | World Int. Prop. O. . | |
| 8504650 | 10/1985 | World Int. Prop. O. . | |
| 9002720 | 3/1990 | World Int. Prop. O. . | |
| 04851 | 4/1992 | World Int. Prop. O. | 4/449 |

Primary Examiner—Henry J. Recla
Assistant Examiner—Charles R. Eloshway
Attorney, Agent, or Firm—Lorusso & Loud

[57] ABSTRACT

A composting toilet comprising an outer shell with an attached toilet seat, a composting space adapted to the interior of the outer shell and a ventilation duct attached to the outer shell. The composting space is a rotatable drum, into which solid toilet waste is collected and further transferred therefrom into a collecting container, shaft, or similar storage. The attached toilet seat is able to conduct liquids separately from solid waste. The invention is implemented by a construction in which the outer drum is thermally insulated and, in conjunction with the inlet opening of the drum, to the interior of the outer shell, there is adapted a stationary wall having a ventilation hole, and the toilet seat able to conduct liquids separately from solid waste is adapted to the outer shell at the location of the wall, so as to allow solid waste entering via the toilet seat to fall through a hole in the wall directly onto the inside surface of the drum.

8 Claims, 3 Drawing Sheets

COMPOSTING TOILET

The present invention concerns a composting toilet comprising an outer shell with a toilet seat adapted to it, and a composting space adapted to the inside of the outer shell, said space being a rotatable drum into which solid toilet waste is collected and from which it is transferred into a collecting container, shaft or similar storage, and means for conducting liquids separately from solid waste, and a venting duct attached to the outer shell.

During composting, the core of the compost actively produces heat, which is prevented from being lost with the help of a thick layer of the compost mass surrounding the core. The compost layer surrounding the compost core also helps slow excessive gas diffusion and thus is capable of reducing the cooling effect of the surrounding air. The superficial layer of the compost on one side continually receives the waste heat emitted by the core and, on the other side, it is cooled and dried by the freely moving air that surrounds the compost.

Simulation of the conditions of a compost pile, particularly those of the superficial layer has been aimed at in such currently known composting toilets, especially in the electrically-powered types, that endeavour to achieve augmented composting. Such toilets use fan-boosted ventilation and electrical heating to enhance composting. These two basically contradictory functions mainly tend to cancel each other. The desired function of composting improvement is thereby hampered. Furthermore, the above-described toilets require externally supplied energy. The composting process is decelerated if the agitation of the compost mass is ineffective or totally lacking (/lacks totally). Resultingly, moisture and the support material may become unevenly dispersed in the bulk. Further, particles which differ in density from the average bulk, such as paper, may remain unmixed in the compost mass. Composting toilets of the above-described type are disclosed, i.a., the following publications: FI-54699, FI-854582, FI-2685/72 and FI-52709.

The same drawbacks are also found in unheated containers of direct-composting toilets and in household waste composting equipment in general. The disadvantages of insufficient agitation are aimed to be compensated for by an over-dimensioned ventilation whose concomitant cooling effect impedes the composting process. This, unfortunately, compels to enlarge the equipment size, thereby leading to increased costs and more complicated toilet use and maintenance. Such a composting toilet is disclosed in, for instance, the Finnish patent FI-58487.

The present invention concerns a novel composting toilet which is capable of overcoming the above-mentioned drawbacks. The composting toilet in accordance with the invention is characterized in that its digester drum is thermally insulated, and that a stationary wall abutting the inlet opening of the drum is adapted to the interior of the toilet shell, said wall having a vent in it, and that in the outer shell, at the wall, there is adapted a toilet seat with liquids separation means so as to allow a free fall of solid waste through a hole in the wall directly onto the inside surface of the drum.

A preferred embodiment of the composting toilet in accordance with the invention is characterized by a recess adapted to its wall, said recess protruding into the drum, and by a discharge hole arranged to that wall of said recess which is opposingly facing the rotational direction of the drum, said hole permitting the discharge of the composted mass into a collecting container placed in said recess, and the container is removable via an opening access hatch placed in the outer shell of the toilet at the location of the recess.

Another preferred embodiment of the composting toilet is characterized by having the toilet seat placed partially to the inside of the inlet opening of the drum.

A further another preferred embodiment of the composting toilet in accordance with the invention is characterized in that the center of the drum bottom has a discharge hole, via which a portion of the compost mass contained in the drum is routed to a collecting container, shaft or similar storage outside the drum.

Due to the good thermal insulation of the drum in the composting toilet in accordance with the invention, the drum itself produces the necessary heat energy for the fermentation process, thus dispensing with the need for an external heat source. The generated heat also brings about the intermittently mandatory toilet ventilation, thus making forced ventilation unnecessary. The agitation in the drum provides for an immediate covering of the waste, minimization of support material need, equalization of moisture, oxygenation of the compost mass, and packing of the fermented mass into an easily removable collecting container. In the composting toilet in accordance with the invention, ventilation is cut off almost immediately after use, whereby air humidity and temperature can rapidly return back to optimum levels. Because liquids such as urine and washing water are not conducted to the composting space, moisture and consistency of the compost mass are retained at optimum levels. The fermented end product in the collecting container is completely odourless and homogeneous.

Figure 2:
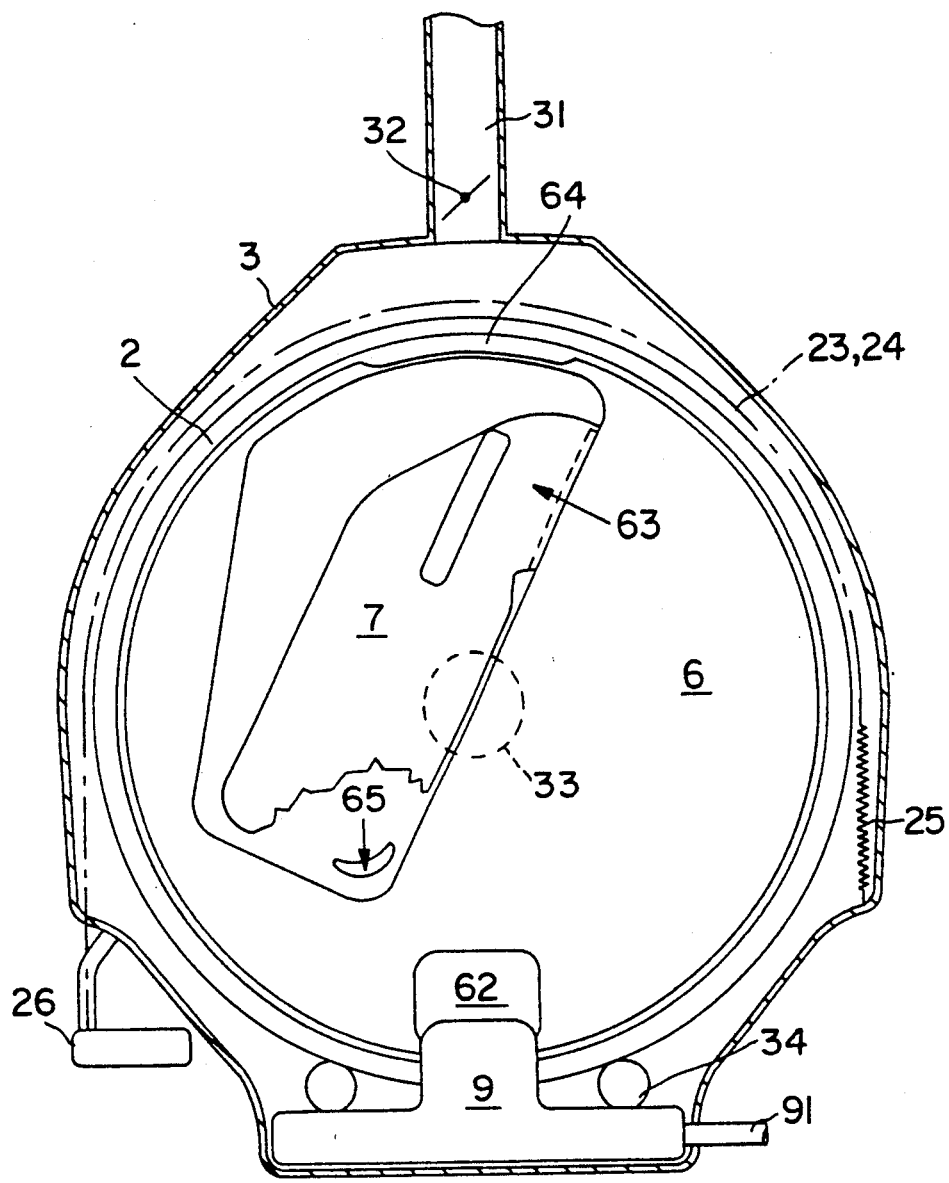
Figure 3:
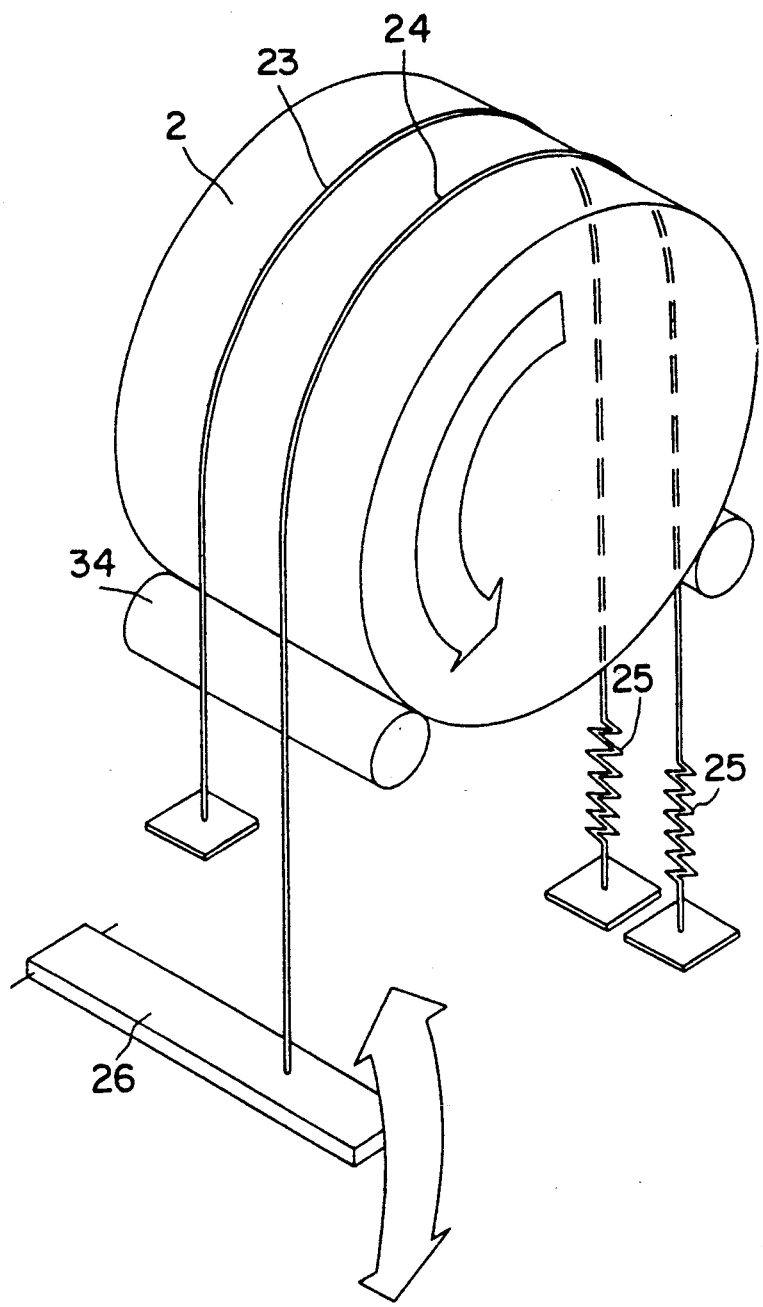

In the following, the invention will be examined in greater detail with the help of a preferred exemplifying embodiment with reference to the attached drawings, in which FIG. 1 shows in a partially sectional side view a composting toilet in accordance with the invention, FIG. 2 shows the composting toilet illustrated in FIG. 1 from the direction of arrow 1, with the toilet seat (parts 4, 41 . . . 46 and 5) and the front part of the outer shell 3 removed, and FIG. 3 shows diagrammatically a rotating mechanism of the drum in the composting toilet seat in accordance with the invention.

According to FIGS. 1 and 2, the composting toilet comprises an outer shell 3, a toilet seat 4 and a composting space 2 adapted to the inside of the outer shell, said composting space being a rotatable drum. The longitudinal axis of the drum 2 is inclined from horizontal upward at an angle, preferredly approx. 30°. The drum 2 is pivotally mounted on bearings at a hub 22 to the outer shell 3, and its rotation is facilitated by support rolls 34, rotationally mounted on bearings to the outer shell, said rolls backing the drum 2 at its end of the inlet opening. The drum 2 is thermally insulated, whereby heat loss is avoided and the heat energy produced by the fermenting mass is retained in favour of the composting process, thus dispensing with the need for an external heat source. After use of the toilet, the drum 2 is rotated by means of a mechanical drive either manually with, for instance, a pedal, or by a motor. The inside of the drum 2 is equipped with fins 21, which promote the agitation of the fermenting mass. The fins 21 on the inside of the drum 2 are aligned either crossdirectionally with or inclined to the rotational direction of the drum.

The inlet opening of the drum 2 is closed by a partially or entirely thermally insulated stationary wall 6, which remains under the outer shell 3, there facing the compost mass. The wall 6 is provided with an inlet hole 62 and discharge hole 63 of the waste. A recess 61 protruding into the interior of the drum 2 is formed to the wall 6. In practice the mass to be composted that is contained in the drum 2 resides in the space delineated by the drum 2 and the recess 61, said space having a volume of approximately half of the drum volume. Adapted to that wall of the recess 61 which is opposingly facing the rotational direction of the drum 2 is a hole 63, through which the composted mass can be discharged by virtue of the rotation of the drum 2 into a collecting container 7 placed in the recess 61. Furthermore, the wall of the recess 61 opposingly facing the rotational direction of the drum 2 is inclined from horizontal upward at an angle, preferredly 45° . . . 70°, whereby said wall prevents the particles of the compost mass pile from freely tumbling into the lower part of the drum 2 and from forming into poorly fermenting balls of compost mass.

The mouth section of the opening of the collecting container 7 is adapted tightly fitting to the hole 63 in the wall of the recess 61. The collecting container 7 can be removed via an opening access hatch 8 placed in the outer shell 3 at the location of the recess 61. The bottom of the recess 61 is provided with a return hole 65 for recycling back to the drum 2 those compost mass clumps which may possibly fall over during the emptying of the collecting container 7.

The hub 22 at the bottom of the drum 2 has a discharge hole 33, through which a portion of the compost mass contained in the drum 2 can be conducted to a collecting container, shaft or similar storage placed outside the drum 2.

The underside of the toilet seat 4 having a curved surface 45, is equipped with a transferrable member such as a shutter 5, which in a closed position allows only liquids entering via the toilet seat 4 such as washing water and/or urine to be conducted past the composting space into a separate collecting container, treatment process or out from the toilet, and in an open position allows solid waste entering via the toilet seat 4 to fall through a hole 62 in the wall 6 directly onto the inside surface of the drum 2. When shutter 5 is in the open position, liquids are separated from solid waste by flowing down curved surface 45. The toilet seat 4, together with its associated separation means 5, is disclosed in a parallel patent application.

Liquids are conducted via members 9 and 91 out from the composting toilet. The liquids separation means achieve excessive dampening of the compost mass, thereby avoiding disturbances to the fermenting process.

The composting toilet can be connected to a water pipe for, e.g., the flushing of the interior of the toilet seat 4.

The outer shell 3 has a ventilation duct 31 attached to it, complemented when necessary with a valve 32. The valve 32 makes it possible to open and close the toilet ventilation. Usually, the valve 32 is opened only during the use of the toilet. This arrangement miminizes heat losses. The ventilation air of the composting toilet enters the composting space 2 through the toilet seat via the hole 62 and exits via the ventilation duct 31.

Diagrammatically illustrated in FIG. 3 is a rotating mechanism of the drum 2 designed for rotation of the drum 2 with the help of a pedal 26. There are two ropes 23, 24 adapted to pass over the outer circumference of the drum 2. One end of the ropes 23, 24 has attached a spring 25 whose other end is fixed to the frame of the composting toilet. One rope 24 is fixed at its other end to the pedal 26, while the other rope 23 is fixed to the frame of the composting toilet. By depressing the pedal 26, the user can make the rope 24 to move in the direction indicated by the arrow, resulting in the rotation of the drum 2 in the same direction by means of the friction between the rope 24 and the drum 2.

The frictional rotating means can be replaced by providing teeth to the outer circumference of the drum 2 and appropriate elements compatible with the toothing onto the rope. Such elements can be, e.g., cylindrical cog pins threaded on the rope. The rope 23 acts as ratchet preventing the drum from rotating backward by the weight of the contained mass.

For those versed in the art, it is obvious that the invention is not limited to the exemplifying embodiments described above; by contra.t, the invention can be varied within the claims disclosed herein.

What is claimed is:

1. A composting toilet comprising:
   an outer shell, having an interior and an exterior;
   a rotatable drum defining a composting space and having a side wall portion and a bottom portion with a hub disposed therein rotatably mounting said drum within said outer shell;
   collection means for collecting solid toilet waste in said drum;
   a toilet seat mounted in said outer shell and having liquids separation means for conducting liquids separately from solid waste;
   a ventilation duct attached to the outer shell whereby the drum is thermally insulated;
   a stationary wall attached to the interior of the outer shell, said stationary wall having a lower portion defining an inlet opening into said drum and disposed within said drum thereby defining a ventilation passage between said drum and said stationary wall communicating with said ventilation duct; whereby
   the toilet seat with the liquids separation means is adapted in the outer shell at the location above the inlet opening in the lower portion of the stationary wall, so as to allow solid waste entering via the toilet seat to fall through said inlet opening in the lower portion of the stationary wall directly onto the inside surface of the drum and liquids to flow to a location outside said drum.

2. A composting toilet as claimed in claim 1, characterized in that at least a part of the toilet seat is located above the stationary wall.

3. A composting toilet as claimed in claim 1, characterized in that the stationary wall includes a recess having a wall portion with a discharge hole formed therein, said wall with said discharge hole being situated transversely to a rotational axis of said drum wherein said discharge hole permits collection of composted solid waste into a collecting container adapted to be received by said recess, said collecting container being removable via an opening access hatch which is connected to the outer shell at the location of the recess.

4. A composting toilet as claimed in claim 1, characterized in that the hub at the bottom of the drum includes an inlet opening and a discharge hole through which composted solid waste can discharge to a location outside the drum.

5. A composting toilet as claimed in claim 3, characterized in that the recess includes a return hole located in a bottom portion of said recess, wherein said return hole communicates with said composting space defined by said drum, thus enabling composted waste, which may inadvertently fall into said recess through said discharge hole, to be recycled back to said composting space.

6. A composting toilet as claimed in claim 1 characterized in that includes fins for stirring composted solid waste.

7. A composting toilet as claimed in claim 1, characterized in that said drum is adapted to be rotated by:
 a first rope, whose one end is attached by means of a spring adapted to be connected to the outer shell and whose other end is attached to a pedal located exteriorly of said outer shell, a middle portion of said first rope extending substantially around the circumference of said drum;
 a second rope, whose one end is attached by means of a spring adapted to be connected to the outer shell and whose other end is fixed, a middle portion of said second rope extending substantially around the circumference of said drum; whereby
 depression of said pedal permits rotation of said drum by said first rope, while said second rope remains substantially stationary relative to said first rope, thereby preventing counter-rotation of said drum when said pedal is released.

8. A composting toilet as claimed in claim 1, characterized in that the ventilation duct is provided with a valve.

* * * * *